(12) United States Patent
Kurian

(10) Patent No.: US 10,454,993 B2
(45) Date of Patent: Oct. 22, 2019

(54) SMART RESOURCE INSTRUMENT AUTHORIZATION

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 15/730,587

(22) Filed: Oct. 11, 2017

(65) Prior Publication Data

US 2019/0109885 A1   Apr. 11, 2019

(51) Int. Cl.
*H04W 80/04*   (2009.01)
*H04W 76/10*   (2018.01)
(Continued)

(52) U.S. Cl.
CPC .............. *H04L 67/02* (2013.01); *H04L 63/08* (2013.01); *H04L 67/12* (2013.01);
(Continued)

(58) Field of Classification Search
CPC ...... G06Q 20/042; G06Q 20/40; G06Q 20/10; G06Q 20/354; G06Q 20/382; G06Q 20/4016; G06Q 30/06; G06Q 20/065; G06Q 20/102; G06Q 20/02; G06Q 20/12; G06Q 20/32; G06Q 20/00; G06Q 20/22; G06Q 20/3674; G06Q 20/3678; G06Q 20/401; G06Q 30/0609; G06Q 20/108; G06Q 20/20; G06Q 20/3821; G06Q 20/40145; G06Q 20/355; G06Q 20/3825; G06Q 30/0281; G06Q 30/0601; G06Q 30/0613; G06Q 30/0641; H04L 63/08; H04L 63/0853; A61M 2205/13; A61M 2205/3306; A61M 2205/3368; A61M 2205/3375; A61M 2205/3561; A61M 2205/3606; A61M 2205/3633; A61M 2205/364; A61M 2205/3646; A61M 2205/3653; A61M 2205/502; A61M 2205/6045;
(Continued)

(56) References Cited

U.S. PATENT DOCUMENTS 3,959,789 A * 5/1976 McGahee ............ A45C 11/184
                                                            340/529
4,737,911 A   4/1988 Freeman, Jr.
(Continued)

*Primary Examiner* — Backhean Tiv
*Assistant Examiner* — Linh T. Nguyen
(74) *Attorney, Agent, or Firm* — Michael A. Springs; Moore & Van Allen PLLC; Jeffrey R. Gray

(57) ABSTRACT

A resource instrument system and/or user computer systems can monitor when one or more resource instruments have been removed from the resource instrument system and notify the user and/or entity that one or more resource instruments have been removed from the resource instrument systems in order to help identify potential misappropriation of the one or more resource instruments. Moreover, the user may pre-authorize the use of one or more resource instruments through the resource instrument system and/or the user computer system. In this way, a third-party receiving the resource instrument may check the validity of the resource instrument before acceptance of the resource instrument.

18 Claims, 5 Drawing Sheets

(51) Int. Cl.
*H04W 12/06* (2009.01)
*H04L 29/08* (2006.01)
*H04L 29/06* (2006.01)

(52) U.S. Cl.
CPC ....... *H04W 12/0602* (2019.01); *H04W 76/10* (2018.02); *H04W 80/04* (2013.01); *H04L 2463/082* (2013.01)

(58) Field of Classification Search
CPC .. A61M 2205/6054; A61M 2205/6063; A61M 2205/8206; A61M 5/002; A61M 5/142; A61M 5/16804; A61M 5/24; A61M 5/44; A61M 5/445
USPC ........ 705/44, 64, 18, 40, 34, 39, 41, 67, 16, 705/17, 1.1, 42, 75, 76, 43; 340/568.1, 340/547, 568.7
See application file for complete search history.

(56) References Cited

U.S. PATENT DOCUMENTS

| | | | |
|---|---|---|---|
| 5,093,787 A | 3/1992 | Simmons | |
| 5,233,547 A | 8/1993 | Kapp et al. | |
| 5,337,263 A | 8/1994 | Patermaster | |
| 5,903,881 A | 5/1999 | Schrader et al. | |
| 6,431,439 B1 | 8/2002 | Suer et al. | |
| 7,213,003 B1 | 5/2007 | Kight et al. | |
| 7,290,704 B1 | 11/2007 | Ball et al. | |
| 7,853,524 B2 | 12/2010 | Kight et al. | |
| 7,979,351 B1* | 7/2011 | Vollmer | G06Q 20/10 705/1.1 |
| 8,025,218 B2 | 9/2011 | Carpenter et al. | |
| 8,121,944 B2 | 2/2012 | Norman et al. | |
| 8,165,956 B2 | 4/2012 | Kitchen et al. | |
| 8,676,706 B2 | 3/2014 | Jones et al. | |
| 8,874,480 B2 | 10/2014 | Panthaki et al. | |
| 9,361,615 B1* | 6/2016 | Clemence | G06Q 20/354 |
| 9,600,837 B2 | 3/2017 | Song et al. | |
| 2003/0007676 A1 | 1/2003 | Cato | |
| 2003/0047609 A1* | 3/2003 | Endo | H04N 1/00588 235/454 |
| 2003/0126082 A1* | 7/2003 | Omura | G06Q 20/042 705/42 |
| 2004/0002926 A1 | 1/2004 | Coffy et al. | |
| 2004/0236647 A1 | 11/2004 | Acharya | |
| 2004/0236688 A1* | 11/2004 | Bozeman | G06Q 20/04 705/42 |
| 2005/0149544 A1* | 7/2005 | Bishop | G06Q 20/00 |
| 2006/0015428 A1 | 1/2006 | Friedman | |
| 2007/0100749 A1 | 5/2007 | Bachu et al. | |
| 2007/0285723 A1 | 12/2007 | Fabel et al. | |
| 2008/0091603 A1 | 4/2008 | Page | |
| 2008/0140552 A1 | 6/2008 | Blaikie | |
| 2008/0215377 A1 | 9/2008 | Wottowa et al. | |
| 2008/0249931 A1 | 10/2008 | Gilder et al. | |
| 2009/0024520 A1 | 1/2009 | Drory et al. | |
| 2010/0027896 A1 | 2/2010 | Geva et al. | |
| 2010/0280859 A1 | 11/2010 | Frederick | |
| 2011/0071934 A1 | 3/2011 | Brown et al. | |
| 2011/0270750 A1* | 11/2011 | Abrams, Jr. | G06Q 20/04 705/41 |
| 2013/0311382 A1* | 11/2013 | Fosmark | G06Q 20/02 705/71 |
| 2017/0154319 A1* | 6/2017 | Gromley | G07F 19/209 |

* cited by examiner

SMART RESOURCE INSTRUMENT AUTHORIZATION

FIELD

The present invention relates to utilizing a smart resource instrument to enter into interactions, and more particularly a smart resource instrument that has the ability to scan resource information from resource instruments and write resource information on resource instruments.

BACKGROUND

Resource instruments allow parties to enter into interactions with each other; however, resource instrument technology has not changed over a long period of time. Resource instrument technology improvements are needed that improve the functionality of using resource instruments for interactions, but allowed the continued use of using traditional processing channels.

BRIEF SUMMARY

Embodiments of the present invention address these and/or other needs by providing innovative systems, methods and computer program products for utilizing a smart resource instrument system and one or more resource instruments associated therewith to improve upon interactions between various parties.

In particular, one or more resource instrument systems, alone or in combination with a user computer system, may be utilized to capture information from third-party resource instruments associated with interactions. The interaction information may be captured using a reader component, and thereafter processed in order to provide more information to the parties, as well as to process the third-party resource instruments more quickly. Additionally, or alternatively, the resource instrument systems may automatically capture interaction information associated with an interaction and automatically create one or more first resource instruments, using a writing component, in order utilize the one or more first resource instruments more effectively in interactions. Moreover, the resource instrument systems of multiple parties may interact with each other to felicitate electronic interactions that may include physical resource instruments to capture the electronic interactions. In other situations, the resource instrument systems and/or user computer systems can monitor when one or more resource instruments have been removed from the resource instrument systems and notify the user and/or entity that one or more resource instruments have been removed from the resource instrument systems in order to help identify potentially misappropriation of the one or more resource instruments of the user. Moreover, the user may pre-authorize the use of one or more resource instruments through the resource instrument system and/or the user computer system. In this way, a third-party receiving the resource instrument may check the validity of the resource instrument before acceptance of the resource instrument, and/or the user may prevent misappropriation of the resource instrument.

Embodiments of the invention comprises systems, methods, and computer program products for pre-approving use of one or more resource instruments. The invention comprises receiving an activation indication from a user for activation of the one or more resource instruments for one or more interactions, wherein the activation indication includes at least one or more resource instrument identifiers, and wherein the activation indication is received from a user computer system or a resource instrument system. The invention further comprises activating the one or more resource instruments for the one or more interactions using the one or more resource instrument identifiers. The invention also comprises receiving an inquiry from a third-party regarding an interaction, wherein the inquiry includes interaction information, wherein the interaction information includes at least a resource instrument identifier, and wherein the inquiry is received from a third-party system. The invention further comprises determining when the resource instrument identifier received from the third-party meets the one or more resource instrument identifiers activated by the user and send an allowance notification to the third-party, wherein the allowance notification is sent to the third-party systems. Alternatively, the invention comprises determining when the resource instrument identifier received from the third-party fails to meet the in the one or more resource instrument identifiers activated by the user and send an rejection notification to the third-party, wherein the rejection notification is sent to the third-party systems.

In further accord with embodiments of the invention, the activation indication from the user further includes one or more interaction requirements for the one or more resources instruments. The invention further comprises comparing the interaction information received from the third-party with the one or more interaction requirements received from the user. An allowance notification is sent when the interaction information meets the one or more interaction requirements, and a rejection notification is sent when the interaction information fails to meet the one or more interaction requirements.

In other embodiments of the invention, the one or more resource instrument identifiers comprise a resource pool number and a resource instrument number.

In still other embodiments, the invention further comprises receiving a separation indication that a resource instrument has been separated from a resource instrument connector.

In yet other embodiments of the invention, the resource instrument and the resource instrument connector are operatively coupled through a marker, and wherein the resource instrument system receives a signal from the marker when the resource instrument has been separated from the resource instrument connector.

In further accord with embodiments of the invention, the marker is a conductor that when torn loses an electrical current that results in the signal, is a sticker that when removed loses the electrical current that results in the signal, is a radio frequency identification tag that when removed results in the signal, or a chip that when torn results in the signal.

In other embodiments, the invention comprises sending a separation notification to the user that the resource instrument has been separated from the resource instrument connector, wherein the separation notification is sent to the user computer systems.

In yet other embodiments, the invention comprises receiving a rejection indication from the user to reject activation of the resource instrument.

In still other embodiments of the invention, receiving the activation indication from the user to activate one or more resource instruments for the one or more interactions comprises receiving the activation indication from the user to activate the resource instrument after the resource instrument has been separated from the resource instrument connector.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
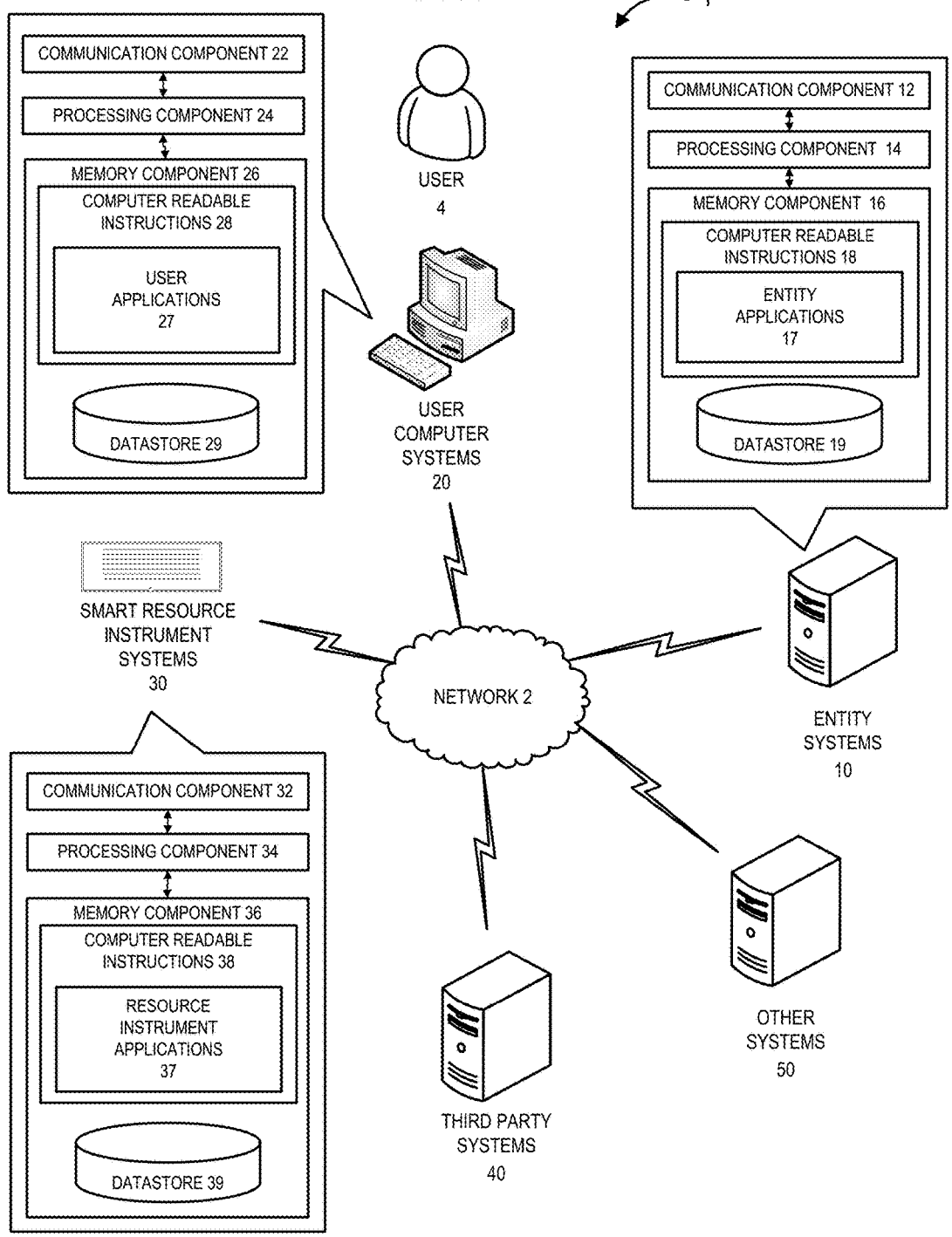

Having thus described embodiments of the invention in general terms, reference will now be made the accompanying drawings, wherein:

FIG. 1 presents a block diagram illustrating a smart resource instrument system environment, in accordance with embodiments of the invention.

Figure 2A:
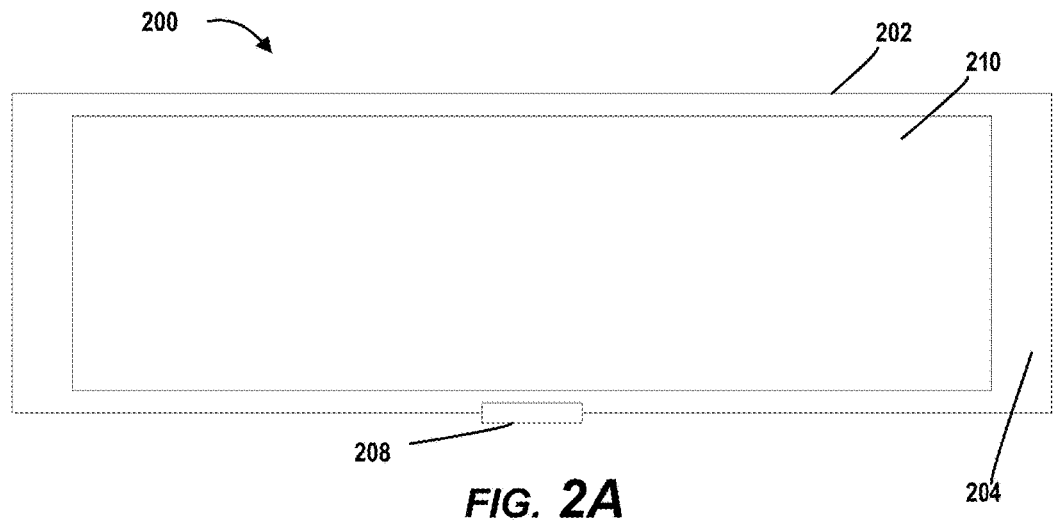
Figure 2B:
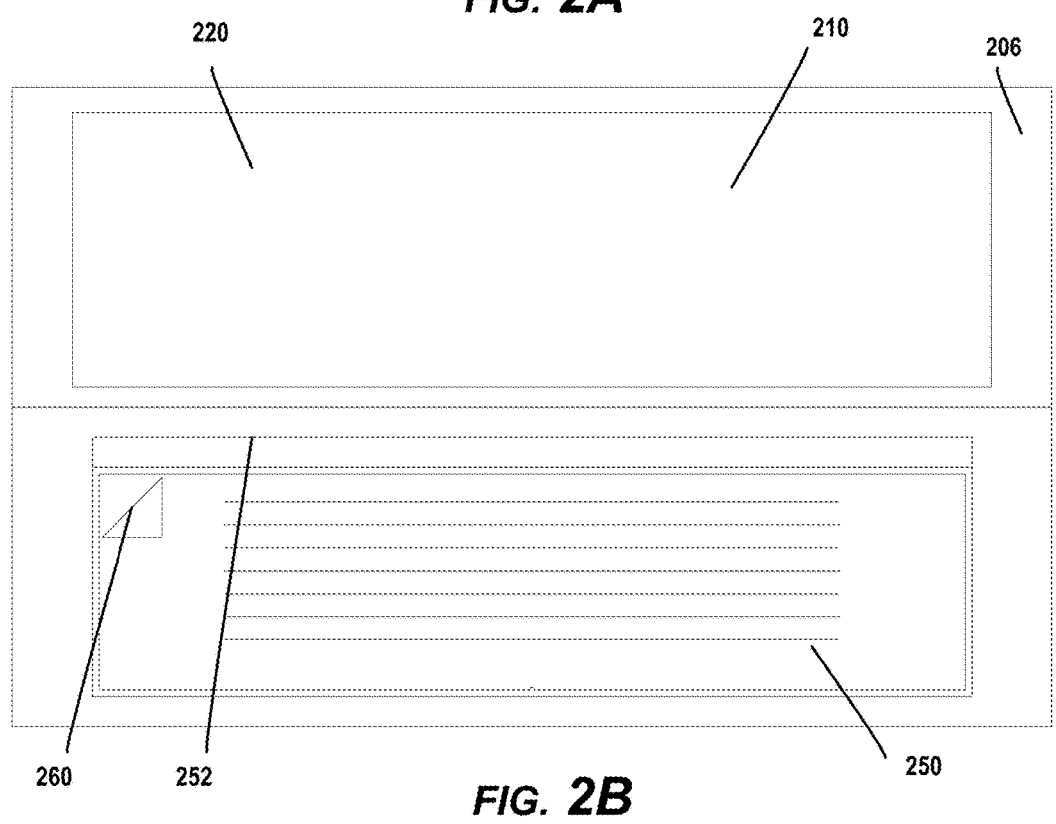
Figure 3:
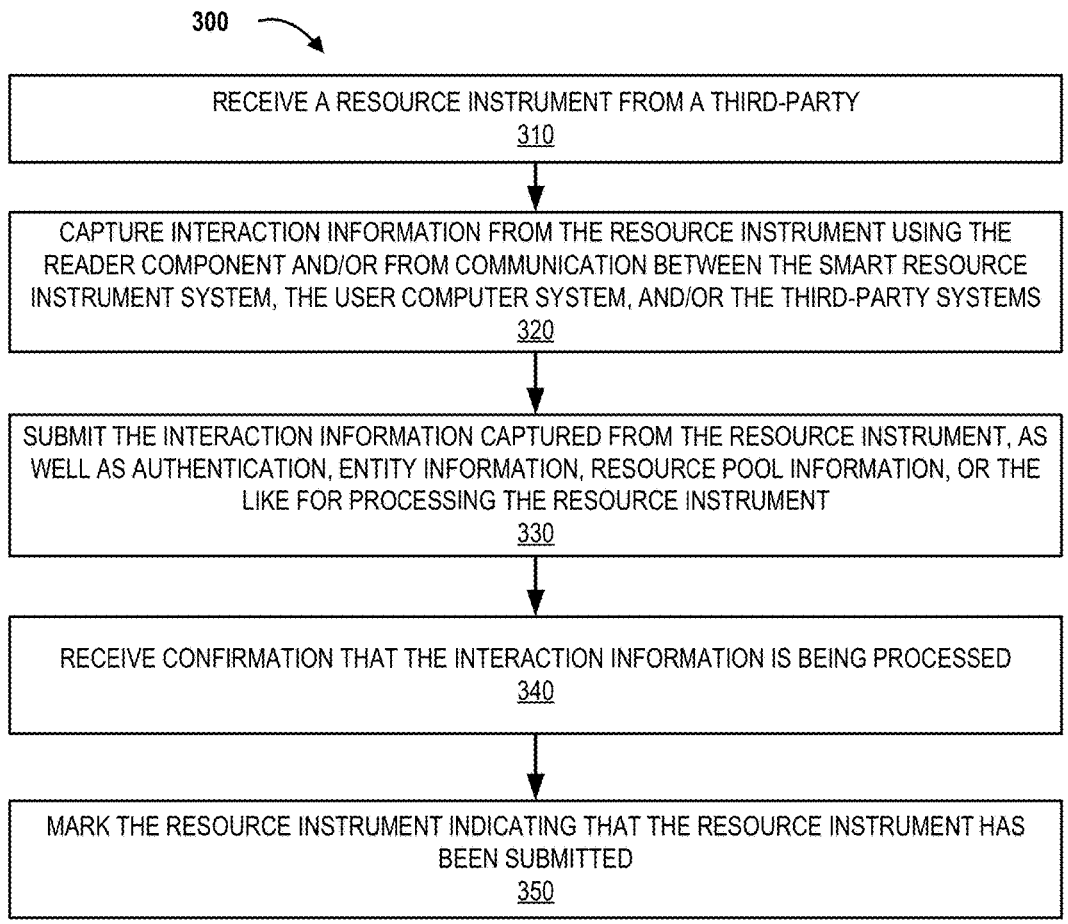
Figure 4:
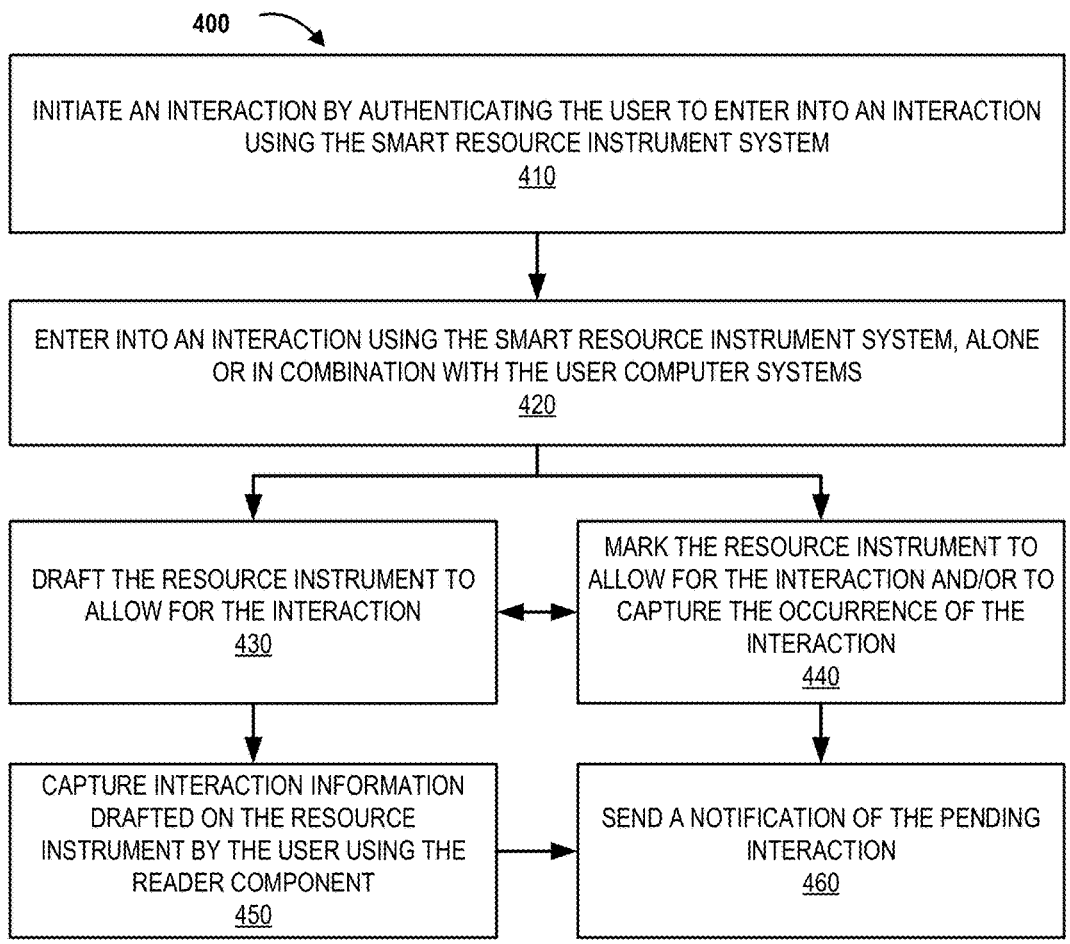

FIG. 2A presents a view of the smart resource instrument system in a closed configuration, in accordance with embodiments of the invention;

FIG. 2B presents a view of the smart resource instrument system in an open configuration, in accordance with embodiments of the invention;

FIG. 3 presents a flow diagram for utilizing the smart resource instrument system to receive a resource instrument for an interaction, in accordance with embodiments of the invention;

FIG. 4 presents a flow diagram for utilizing the smart resource instrument system to use a user's resource instrument for an interaction, in accordance with embodiments of the invention.

Figure 5:
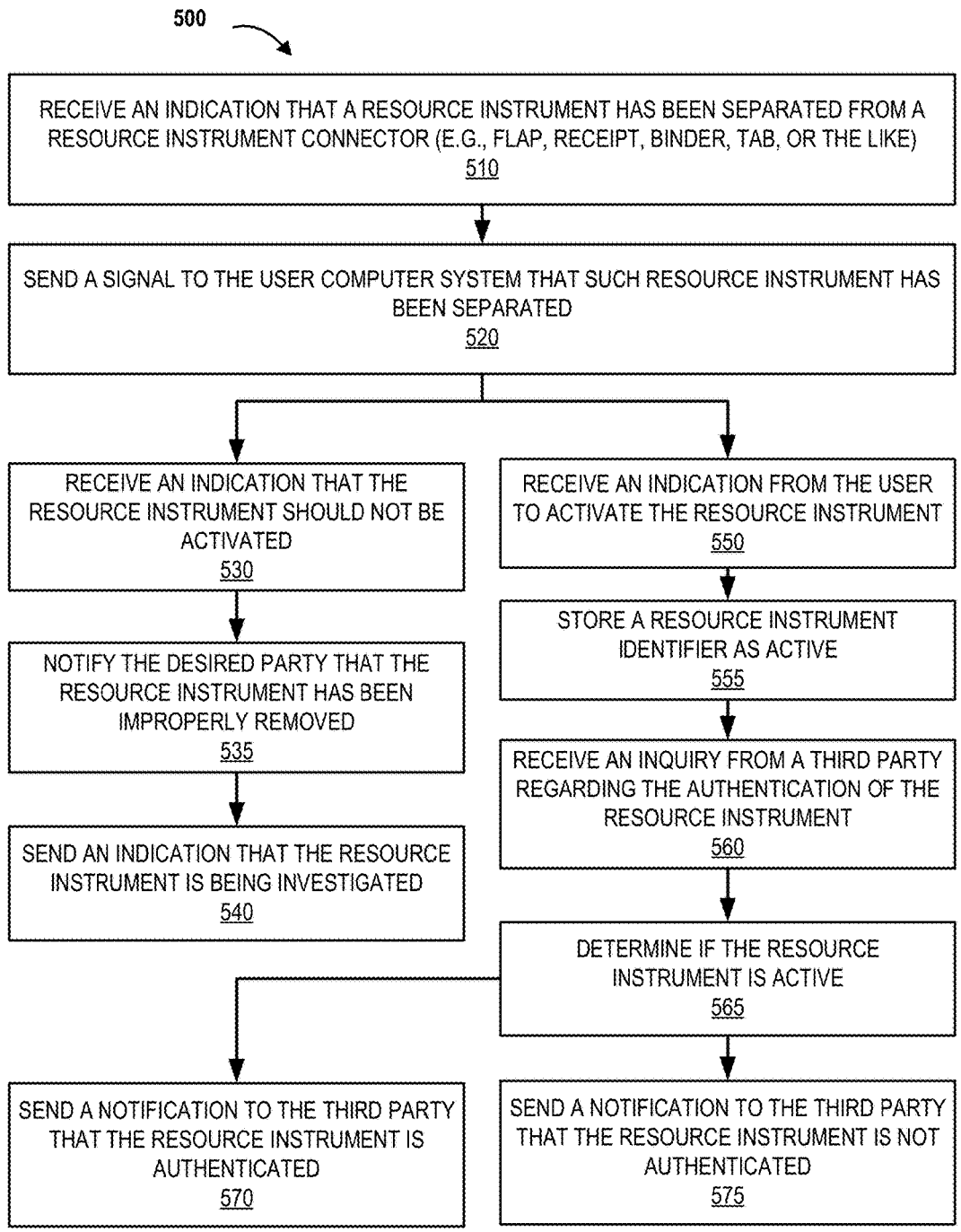

FIG. 5 presents a flow diagram for a pre-authorization and/or notification of misappropriated resource instruments, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements.

As will be described throughout this disclosure, the resource instrument system and its methods of use provide a number of technical benefits for utilizing resource instruments in interactions. For example, the resource instrument system may be utilized to more quickly process resource instruments when received, and check the validity of the resource instruments before interactions are completed. Moreover, the resource instrument system tracks when resource instruments have been removed from the resource instrument system, and thus, provides ways to prevent the misappropriation of the resource instruments. Additionally, the present invention allows for the ability to control the use of specific resource instruments using current processing technology. The resource instrument system may further improve the writing of resource instruments by automatically writing interaction information on the resource instruments. These are just a few of the technical improvements resulting from the present invention.

FIG. 1 illustrates a smart resource instrument system environment 1, in accordance with embodiments of the invention. As illustrated in FIG. 1, one or more entity systems 10 are operatively coupled, via a network 2, to one or more user computer systems 20, smart resource instrument systems 30, third-party systems 40, or other like systems. In this way, the users 4 may utilize the user computer systems 20 and/or the smart resource instrument systems 30 to enter into interactions through the use of the entity systems 10.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the user computer systems 20, smart resource instrument system 30, the third-party systems 40, or other like systems. As such, the one or more communication components 12 generally comprise a wireless transceiver, modem, server, electrical connection, electrical circuit, or other component for electronically communicating with other components on the network 2. The one or more communication components 12 may further include an interface that accepts one or more network interface cards, ports for connection of network components, Universal Serial Bus (USB) connectors and the like.

As further illustrated in FIG. 1, the entity systems 10 comprise computer-readable instructions 18 stored in the memory component 16, which in one embodiment includes the computer-readable instructions 18 of the entity applications 17. In some embodiments, the one or more memory components 16 include one or more data stores 19 for storing data related to the entity systems 10, including, but not limited to, data created, accessed, and/or used by the entity applications 17. The one or more entity applications 17 may be utilized by the entity systems 10 to manage resource pools for various users.

As illustrated in FIG. 1, users 4 may access the entity applications 17 on the entity systems 10, the resource instrument applications 37 on the smart resource instrument systems 30, and/or interact with the third-party systems 40 through user computer systems 20, such as through the use of a user application 27. The user computer systems 20 may be a desktop, laptop, tablet, mobile device (e.g., smartphone device, mobile watch, mobile wearable, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the entity systems 10, the smart resource instrument systems 30, the third party systems 40, or other systems. As such, the one or more communication components 22 generally comprise a wireless transceiver, modem, server, electrical connection, or other component for electronically communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of user applications 27, such as dedicated applications (e.g., apps, applet, or the like), portions of dedicated applications, web browser or other apps that allow access to applications located on other systems, or the like. As previously discussed, the entity applications 17, or a portion thereof, may be stored on the user computer systems 20.

As illustrated in FIG. 1, the smart resource instrument systems 30 (otherwise described herein as just resource instrument systems 30), may be utilized by the user 4 directly, or through the user computer systems 20, as will be described in further detail herein. As such, the smart resource instrument systems 30 may interact with each other (e.g., other smart resource instrument systems), the entity systems 10, the user computer systems 20, third-party systems 40, and/or other systems 50, such as through a resource instrument applications 37.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the entity systems 10, the user computer systems 20, the third party systems 40, or other systems 50. As such, the one or more communication components 32 generally comprise a wireless transceiver, modem, server, electrical connection, or other component for electronically communicating with other components on the network 2. The one or more communication components 32 may further include an interface that accepts one or more network interface cards, ports for connection of network components, Universal Serial Bus (USB) connectors and the like. Moreover, the one or more communication components 32 may include a keypad, keyboard, touch-screen, touchpad, microphone, mouse, joystick, other pointer component, button, soft key, and/or other input/output component(s) for communicating with the users 4.

In some embodiments the smart resource instrument systems 30 may include one or more writing components that are operatively coupled to the one or more processing components 34, and/or other components. It should be understood that the one or more writing components may be an ink printer component (e.g., that prints ink on the resource instrument), a light exposure printer component (e.g., exposes to the paper of the resource instrument to light in a pattern that imprints the desired interaction information), laser printer component (e.g., laser imprints the desire interaction information on the paper of the resource instrument), heat printer component (e.g., a heat source allows the paper to react to imprint the desired interaction information on the resource instrument), or other printer component. The one or more writing components may mark the one or more resource instruments with an interaction information in order to allow the user to enter into the interaction with a third-party, as will be discussed in further detail later.

Moreover, in some embodiments the smart resource instrument systems 30 includes one or more reader components that are operatively coupled to the one or more processing components 34, and other components. It should be understood that the one or more reader components may include an image capture component (e.g., a camera that captures an image of the resource instrument), a scanner component (e.g., a component that scans the information on the resource instrument), a laser scanner component (e.g., a laser that can capture information from the resource instrument, such as a code on the instrument), a magnetic reader component (e.g., can capture information from magnetic ink on the resource instrument), or other like reader component. The one or more reader components may allow the user 4 to capture information from the one or more resource instruments in order to allow the user 4 to enter into interactions with a third-party, as will be discussed in further detail later. Moreover, the or more writing components may mark the one or more resource instruments with an indicia after the interaction information is captured from the one or more third-party resource instruments using the one or more reader components. The indicia may indicate that the one or more third-party resource instruments have been submitted for processing, such that they cannot be presented again for processing.

As illustrated in FIG. 1, the smart resource instrument systems 30 may have computer-readable instructions 38 stored in the one or more memory components 36, which in one embodiment includes the computer-readable instructions 38 of resource instrument applications 37, such as dedicated applications (e.g., apps, applet, or the like), portions of dedicated applications, web browsers, or other apps that allow access to applications located on other systems, or the like. The resource instrument applications 37 may allow the smart resource instrument to operate and/or interact with the systems described herein.

The third party systems 40 and/or other systems 50 are operatively coupled to the entity systems 10, user computer systems 20, and the smart resource instrument systems 30, through the network 2. These systems have components that are the same as or similar to the components described with respect to the entity systems 10, user computer systems 20, and/or the smart resource instrument systems 30 (e.g., one or more communication components, one or more processing components, and one or more memory devices with computer-readable instructions of one or more applications, one or more datastores, or the like). Thus, the third party systems 40 and/or other systems communicate with the entity systems 10, user computer systems 20, and the smart resource instrument systems 30, and/or each other in the same or similar way as previously described with respect to the entity systems 10, user computer systems 20, and the smart resource instrument systems 30.

It should be further understood that the systems described herein may have location determination components, such as global positioning components, near field communication components, geo-fencing location components, or the like. The location determination components may be utilized to identify the location of the various systems (e.g., user computer system 20, smart resource instrument systems 30, or other like systems) and/or the user 4 using the systems.

FIGS. 2A and 2B provide embodiments of the smart resource instrument system 200 (e.g., one embodiment of the resource instrument system 30), in particular a smart checkbook system, or other like instrument system. As illustrated by FIGS. 2A and 2B, the smart resource instrument system 200 may include a housing 202 with one or more reading components 210 and one or more writing components 220. In some embodiments of the invention the one or more reading components 210 and writing components 220 may be separate components or integrated components. As illustrated in FIGS. 2A and 2b the one or more reading components 210 and writing components 220 may be located within the housing 202 such that they may be accessed and used when the housing 202 is closed (see FIG. 2A) or open (see FIG. 2B). As will be discussed in further detail later, the one or more reading components 210, may be able to capture information from resource instruments received by a user 4. In one embodiment the one or more reading components 210 may be an image capture component, a scanner component, a laser scanner component, a magnetic recognition scanner, or the like that can capture images and/or information from the images of the resource instrument or the physical resource instrument itself when the resource instrument is slid past, slid through, and/or placed over the one or more reading components 210. As will also be discussed in further detail later, the one or more writing components 212 may be able to imprint information on the one or more resource instruments in order to make the one or more resource instruments active and/or in order to capture a physical confirmation of an interaction.

FIGS. 2A and 2B further illustrate that the housing 202 of the smart resource instrument system 200 may further includes a locking feature 208 that can be controlled by the user 4 and/or the user computer system 20 in order to prevent misappropriation of the resource instruments when the resource instrument system 200 is not in use or in the possession of the user. Additionally, the resource instrument system 200 may further comprise touchscreens (e.g., which may double as the reading component and/or writing components), buttons, keys, or other features that allow the user to enter into interactions, enter or select interaction information, manage resources, use the reader component 210 or writing component 220, or otherwise take actions that the user 4 may typically take using the user computer systems 20.

As illustrated in FIGS. 2A and 2B, in some embodiments the smart resource instruments system 200 may further comprise one or more resource instruments (e.g., negotiable instruments, or the like). The one or more resource instruments 250 may be operatively coupled to a resource instrument connector 252. The resource instrument connector 252 may be a flap, binder, receipt, copy, tab, or the like from which the resource instrument 250 may be attached (e.g., negotiable instruments with a binder, a traveler's check attached to a tab, a money order attached to copies and/or receipts, or the like). The resource instruments 250 and/or the resource instrument connectors 252 may be operatively coupled to a marker 260. The marker 260 may be utilized to provide an indication when the resource instrument 250 has been separated from the resource instrument connector 252 and/or removed from the smart resource instrument system 200. It should be understood that the one or more markers 260 may be operatively coupled to each resource instrument 250 and resource instrument connector 252, such that when the resource instrument 250 is separated (e.g., torn, removed, or the like) from the resource instrument connector 252, the marker 260 is disturbed (e.g., torn, damaged, removed, or the like). For example, the marker 260 may have a current running through it, such as current from a battery in the resource instrument system 200 that passes through the resource instrument connector 252 and/or resource instrument 250 into the marker 260. Once the marker is disturbed the current is severed and a signal may be sent to the resource instrument that such current is severed and the resource instrument has been removed. It should be understood that such marker 260 may be separate from the resource instrument 250 and/or resource instrument connector 252 (placed over), or it may be integral within the resource instrument 250 and/or resource instrument connector 252 (located within). In other embodiments of the invention, the marker 260 may be located within the resource instrument 250 and/or resource instrument connector 252 such that when the resource instrument 250 is removed from the resource instrument system 200 a signal is lost and indication that the resource instrument 250 has been removed may be sent to the user 4. In addition to the marker 250 being used to determine when a resource instrument 250 is removed from the resource instrument system, the same marker 260 and/or a different marker may be used to count the number of resource instruments 250 within the resource instrument system 200.

It should be understood that regardless of the implementation and/or use of the marker 260, the marker 260 may be a conductive strip, a chip, RFID, sticker, near-field communication (NFC), or other like physical feature, such that when the resource instrument 250 is separated from the resource instrument connector 252 and/or the resource instrument system 200 itself, a connection is made or lost, that results in a signal that indicates that the resource instrument 250 has been removed, which may be a legitimate or illegitimate removal. In this way, a user 4 may monitor the location and/or use of individual resource instruments (e.g., so the user 4 knows that they have not been misappropriated).

FIG. 3 illustrates a resource instrument receiving process 300 in which a user 4 utilizes the smart resource instrument system 30 in order to process a received resource instrument. As illustrated by block 310 of FIG. 3, the user 4 (e.g., a first user) may receive a resource instrument from a third-party (e.g., another user, such as a second user, an entity, or the like). The resource instrument may be a physical resource instrument that is provided to the first user 4 from a third-party. For example, a first user 4 may receive a physical resource instrument from a third-party in response to an interaction between the first user 4 and the third-party. As will be described in further detail below the resource instrument may be associated with an interaction that may be finalized on the spot without the first user having to submit a physical resource instrument to the first user's entity for processing.

Block 320 illustrates that the user 4 may capture interaction information from the resource instrument using the resource instrument system 30, such as through the one or more reading components 210. For example, the user 4 may use the reading component 210 in order to capture a resource amount, a recipient of the resource instrument, resource pool identifiers, the third-party providing the resources, location of the third-party (e.g., using a location determining component in the resource instrument system), or the like. In some embodiments, as previously discussed the reading components 210 may be an image capture component, a scanner component, a laser scanner component, or the like. As such, it should be understood that the reading component 210 may be located on an outer surface 204 of the housing 202. Alternatively, instead of, or in addition to, being located on the outer surface 204 of the housing 202, the reading component 210 may be located on an inter surface 206 of the housing 202. As such, the first user 4 may capture resource information using either reading component 210 (e.g., on the outside or inside of the housing 202). In still other embodiments of the invention, at least some of the interaction information may alternatively be captured electronically through communication links established between the resource instrument system 30, the user computer systems 20, and/or the third-party systems 40.

Block 330 of FIG. 3 further illustrates that the interaction information captured from the resource instrument 250 may be submitted immediately for processing. For example, the interaction information may be sent to one or more entity systems 10 for transferring resources to a first user 4 resource pool managed through the entity systems 10. In addition to submitting the interaction information from the resource instrument, the first user 4 may also provide additional interaction information, such as authentication (password, biometric data, location data, and/or the like, as described in further detail later), entity information (e.g., entity identifier), resource pool identifier (e.g., resource pool to which the resources will be delivered), or the like, through the use of the resource instrument system 30. The additional interaction information may be entered by the user directly in the resource instrument system 30, entered into the user computer system 30 and transferred to the resource instrument system 30, or automatically captured from user computer system 20 and/or resource instrument system 30 and transferred to another system as needed.

The interaction information is communicated to the entity system 30 in order to process the resource instruments. In some embodiments of the invention, the resource instrument system 30 may communicate directly with the entity systems 10. However, in other embodiments of the invention, the resource instrument systems 30 may communicate with the user computer systems 30, which in turn communicates with the one or more entity systems 10 in order to provide the interaction information, such as the information from the resource instrument, the first user 4 authorization, the entity information, the resource pool identifier information, or the like for processing the resource instrument.

FIG. 3 further illustrates in block 340 that the user computer system 20 and/or the resource instrument system 30 may receive conformation that the resource instrument is being processed. In some embodiments, the confirmation may be that the interaction information has been received and is being processed. In other embodiments, the confirmation may include an indication that the resource instrument is a valid resource instrument that is active, as will be described in further detail with respect to FIG. 5.

FIG. 3 further illustrates in block 350 that a writing component 220 may be utilized to mark the resource instrument received by the user 4 with an indicia. The writing components 220 may make an indicia indicating the resource instrument has been submitted for processing. The indicia may indicate that the resource instrument is now void and cannot be resubmitted; however, in other embodiment, the indicia indicates that while the resource instrument has already been submitted once, it is still valid for resubmission, but provides a notification to the accepter of the resource instrument that it has previously been submitted for processing. The marking component 220 may mark the indicia on the resource instrument through various means, which will be discussed in further detail with respect to FIG. 4.

Turning to FIG. 4, it illustrates a flow diagram for utilizing the smart resource instrument system 30 during an interaction to draft the resource instruments for the interaction. As illustrated by block 410 in FIG. 4, the first user 4 may initiate an interaction by authenticating the first user to enter into an interaction using the resource instrument system 30. The authentication may involve the user 4 using the user computer system 20 and/or the resource instrument systems 30 to enter into an interaction with a third party (e.g., a merchant, a second user, or other third party). For example, in some embodiments of the invention, the first user 4 may utilize the user computer systems 20 to authenticate the first user 4 to enter into an interaction. That is, the first user 4 may utilize a mobile device in order to enter into an interaction or to activate the resource instrument systems 30 to enter into an interaction. In some embodiments the user 4 may utilize only the resource instruments system 30 to enter into an interaction. In other embodiments of the invention, the user computer system 20 and the resource instrument systems 30 must be located within a distance (e.g., touching, inches, feet, yards, miles, within a merchant location, within a group of merchants, within a geo-fenced location, or the like) in order to authenticate the user 4 for use of the resource instrument system 30. In some embodiments, codes may be sent to either the user computer systems 20 or the resource instrument systems 30, which must be entered into the corresponding system in order authenticate the first user 4. In other embodiments of the invention, the user computer systems 20 and/or the resource instrument systems 30 may utilize fingerprint analysis, facial recognition, gestures, touchscreen movement, passwords, or the like in order to authorize the first user 4.

The systems described herein may require a single authentication for the user 4 to both use the resource instrument system 30 and to access any resource pool information that an entity system 10 may hold for the user 4; however, in other embodiments of the invention, a first authentication is required for the user 4 to utilize the resource instrument system 30, and a second unrelated authentication is required for the user 4 to access the resource pools of the user 4 at the entity systems 10. It should be further understood that for any single authentication process one or more authorization factors may be utilized, as such there may be a single factor to authenticate the first user 4 for entering into an interaction or there may be multiple factors that require meeting to authenticate the first user 4. As such, there may be a single factor authentication of the first user 4, two-factor authentication, or other like multiple factor authentication.

In one example, the resource instrument system 30 may further include a locking component 208. In some embodiments of the invention, the user 4 may provide authentication before the resource instrument system 30 is unlocked, and/or the user computer systems 20 must be located within a distance from the resource instrument systems 30 in order for the lock 208 on the resource instrument housing 202 to open. In this way, additional layers of security are provided so that the resource instruments are less likely to be misappropriated and utilized without the user 4 (e.g., without the user 4 being located adjacent the resource instrument system 30).

Block 420 of FIG. 4 illustrates that the first user 4 may enter into an interaction using the resource instrument system 30. In some embodiments of the invention, the first user 4 may utilize the user computer system 20 and/or the resource instrument system 30 itself, in order to utilize a resource instrument for the interaction. In some embodiments of the invention, the user 4 may use an electronic reference to a resource pool (e.g., digital wallet, or other account reference) to enter into an interaction with a third-party. The interaction may occur through the use of an electronic communication between the user computer system 20 and/or the resource instrument system 30, and a third party system 40 (e.g., merchant point-of-sale system, other user computer system for a second user, resource instrument system of a second user, or the like) of the third-party. As such, the user 4 may enter into an interaction with a third-party through the use of the user computer system 20 that communicates with a third-party system 40. Alternatively, the user 4 may enter into an interaction with a third-party through the use of the resource instrument system 30 that communicates with a third-party system 40. Alternatively, the user computer system 20 or the resource instrument system 30 may communicate with the third-party system 40 and thereafter communicate the interaction with the other system (e.g., the user computer system 20 or the resource instrument system 30).

In order to enter into the interaction, interaction information may be electronically captured. The interaction information, such as the interaction resource amount, interaction product (e.g., good or service), interaction date, interaction entity, or the like may be captured electronically and/or automatically from the interaction with the third-party systems 40. For example, the user computer systems 20 and/or the resource instrument system 20 may capture interaction information from a product provided by a third-party, or from a communication with the third-party system. The interaction may be a transfer of resources between the first user 4 and the third-party, a purchase of products from the third-party, and/or reconciliation of a multiparty interaction.

Moreover, block 430 in FIG. 1 illustrates that in some embodiments the user 4 may draft the resource instrument for the interaction. For example, the user 4 may draft the resource instrument within the resource instrument systems 30 using interaction information received from the third-party (e.g., orally or written interaction information), the user 4 may copy the interaction information captured automatically and electronically (e.g., copy the information from a screen associated with the user computer system 20 and/or resource instrument system 30), or the like. As such, the first user 4 may write at least a portion of the interaction information on one of the plurality of resource instruments 250.

Instead of the user drafting the resource instrument, as illustrated in block 440 of FIG. 4, the resource instrument system 30 may be able to automatically draft at least a portion of the resource instrument through the use of the writing component 220 of the resource instrument system 30. The resource instrument may be drafted in any number of ways, such as an ink printer component (e.g., mini-printer printing the interaction information), light exposure printer component (e.g., light exposure reacts with the paper resource instrument), laser printer component (e.g., laser reacts with the paper resource instrument), heat printer component (e.g., heat is used to react with the paper resource instrument), or the like. As such, the resource instruments may utilized specialized paper and/or chemicals on the paper, to allow the resource instrument to be drafted on demand, through interaction information that is automatically captured and/or entered by the user 4.

Alternatively, a combination of block 430 and 440 may be used to both automatically draft some portions of the resource instrument, while the user 4 physically drafts other portions of the resources instrument (e.g., signs the instrument, or the like).

By allowing the user 4 to draft the resource instruments in real-time, the user 4 may utilized any resource pool of the user 4 with any entity in order to enter into interactions using a single set of resource instruments. That is the user 4 may select the user' resource pool and/or entity associated with the user's resource pool to enter into the interaction. In this case, the resource instruments become generalized instead of being specialized for a particular resource pool and/or entity. Moreover, in some embodiments of the invention the resource instrument system 30 may not allow for the writing of the resource instrument unless funds are available in the particular resource pool of the user 4.

FIG. 4 further illustrates in block 450 that, like block 320 in FIG. 3, the resource instrument systems may capture interaction information from the resource instrument drafted by the user 4 through the use of a capture component 210, as previously discussed. As such, if the user 4 physically drafts a portion of the resource instrument, a record may be captured by the resources instrument system 30.

Block 460 in FIG. 4 further illustrates that the interaction information, which was either captured from a resource instrument drafted by the first user 4, or captured automatically from the interaction with the third-party 40 and marked on the resource instrument, is sent for processing as a pending interaction. In some embodiments of the invention, the resource instrument system 30 and/or the user computer system 20 may communicate (e.g., each directly or through the other) with the entity systems 10. In this way, the resources within the resource pool of the user 4 used to enter into the interaction may be allocated until the resource instrument is submitted by the third-party for processing. Moreover, the pending interaction may allow the user 4 to more accurately identify the resources that have been allocated, but have yet to be processed (e.g., for resource pool balancing purposes). In this way, the user 4 may be able to better manage the resources in the user's resource pool. Because the interaction information is captured by the resource instrument system 30 before the resource instrument is submitted for processing by the third-party 40, the resources of the user 4 may be verified as up to date in order to provide improved processing and resource management.

In some embodiments of the invention the resource instrument system may include an interaction completion time limit. For example, a time limit may be required from the interaction initiation to interaction completion. As such, the interaction time may be set as any "N" time value (e.g., seconds, minutes, hours, days, or the like) during which an interaction must be completed. Moreover, the interaction initiation may be set as any one of the authentication of the user 4, the user 4 indicating that the interaction has been initiated through a feature in the resource instrument system 30 and/or user computer system 20, the indication that a marker 260 on the resource instrument is disturbed (e.g., torn, or the like), the electronic communication between the resource instrument system 30 and/or the user computer system 20 with a third-party system 40 with which the interaction is being initiated (e.g., point of sale system, other user computer system or resource instrument system), the electronic drafting of the resource instrument begins, or other like event. The interaction completion may include the user confirming that the interaction has been completed through a feature in the resource instrument system 30 and/or user computer system 20, the electronic communication between the resource instrument system 30 and/or the user computer system 20 with a third-party system 40 with which the interaction is being completed (e.g., point of sale system, other user computer system or resource instrument system), the user 4 captures resource instrument information from the resource instrument 250 using the resource instrument system 30 (e.g., user captures an image, scans, or the like, the completed resource instrument 250), or other like interaction completion indication.

As such in one embodiments, the interaction time limit may occur from when the marker 260 is disturbed (e.g., interaction initiation) until the user 4 confirms that the interaction is completed (e.g., by selecting a completion interaction feature through the resource instrument system 30 and/or the user computer system 20). In other embodiments there may be multiple interaction time limits for various steps of the interaction. For example, there may be a time limit between when the interaction is electronically entered and when the resource instrument is electronically drafted (e.g., by the writing component 220), between when the resource instrument is electronically drafted and when the marker 250 is disturbed (e.g., resource instrument is torn from the resource instrument connector 252), and between when the marker 260 is disturbed and when the user 4 uses the resource instrument system 30 and/or the user computer system 20 is used to confirm completion of the interaction.

When one or more of the time limits are not met, the resource instrument 250 may be invalidated, the resource instrument 250 may require re-initialization (e.g., user 4 must redraft or add a indicia to the resource instrument), and/or the user 4 must perform additional authorization of the resource instrument (e.g., to confirm that the resource instrument is not being misappropriated).

In some embodiments of the invention, while the resource instrument may be drafted for the purposes of allowing the third-party to submit the physical resource instrument for processing of the resources associated with the interaction, it should be understood that the interaction may be processed electronically, and the resource instrument drafted using the resource instrument system 30 may act as a receipt for the interaction. For example, a user may utilize the user computer system 20 and/or the resource instrument system 30 to enter into an interaction with a third-party. The interaction may be entered as a resource instrument interaction, which typically requires the third party to submit the physical resource instrument for processing using a traditional channel, such as, submitting the physical resource instrument to an entity associated with the third-party for scanning, image capture, or the like, that is then processed through the preferred clearing house channels. However, the present invention allows skipping the traditional processing of the third-party submitting the physical resource instrument, and instead processing the resource instrument through electronic processing (e.g., processing of an image and/or interaction information associated with the resource instrument). That is, the interaction information (including an image of the resource instrument) may be submitted along the traditional processing channel using the electronic information captured by the resource instrument system 30 at the time of the interaction between the user 4 and the third-party. As such, the traditional processing channels may be utilized for processing, but at the same time the present invention allows for real-time confirmation of the resources associated with the resource instrument despite the fact that the traditional routing may require additional time to process the interaction. It should be understood that in some embodiments the resource instrument may be drafted with an indicia that indicates the resource instrument has been submitted electronically, and that the paper resource instrument is acting as receipt for the interaction. Should any disputes arise regarding the interaction, the third-party receiving the physical resource instrument has a written record of the interaction that may be used for verification of the interaction.

In addition, or alternatively, with respect to drafting the physical resource instruments, the present invention may be utilized in order to enter into an interaction electronically with the third-party 40, through the use of the resources instrument systems 30 and/or the user computer systems 20. Moreover, in some embodiments of the invention multiple resource instrument systems 30 may be utilized in order to enter into a multi-party interaction at the same time. As such, in some embodiments of the invention multiple resource instrument systems 30 and/or user computer systems 20 (e.g., of the first user 4, or other users, such as a third user, fourth user, or the like) may be utilized in order to allow multiple users to transfer resources to each other and/or to a third-party 40. For example, in some embodiments of the invention, multiple users may enter into a single interaction with a third-party (e.g., multiple users at a dinner, or other interactions that may require splitting resources between users). In this way, each user involved in an interaction with the third-party 40 may utilized individual resource instrument systems 30 and/or user computer systems 20 to transfer resources to the first user 4 so that the first user 4 may draft the resource instrument for the third-party. In one example, a first user 40 may transfer resources to a third-party system 40 to pay for a multiple party interaction. Additionally, a second user may transfer resources from the second user to the first user 4 through the use of user computer systems 20 and/or resource instrument systems 30 used by each user. In typical interactions the transfer of resources from the second user to the first user would not illustrate the allocation to the third-party. However, in the present invention, the multi-party interaction may automatically allocate the resource from each user, while a single user 4 may provide the resource instrument to the third-party for completion of the interaction.

In some embodiments of the invention, multiple resource systems 30 may be used in an interaction to provide seamless integration and reconciliation of resources involved in an interaction. For example, resource instrument systems 30 may be able to communicate with each other, such that a first user 4 may create a resource instrument 250 (e.g., draft or have automatically drafted) for an interaction with a second user (e.g., through a second user resource system). The second user may accept the resource instrument and capture resource information from the resource instrument to complete the interaction. However, the second user may wish assign different portions of the total resource amount from the first user 4 to other third-parties. As such, the second user receiving the resource instrument may assign at least a portion of the resource instruments to one or more other third-parties, and in response instead of the resources from the resource pool of the first user 4 being transfer to just the resource pool of the second user, a portion of the resources may be distributed to the resource pool of the second user, while other portions of the resources may be distributed directly from the resource pool of the first user 4 to the resource pools of the third-party. In this way, the multiple interactions between the parties can be condensed into a single interaction, which improves processing time, processing capacity, and memory for storing a reduced number of interactions. One example of this may include a first user 4 providing resources to a contractor, which then has to distribute the resources to multiple sub-contractions. Instead of making multiple interactions, the contractor may assign portions of the resources received from the first user 4 to the sub-contractor, such that the resources are transferred directly to the sub-contractors instead of routing through the contractor. As such, the resources can be handed off to different parties as desired.

In the embodiments where a resource instrument system 30 of a first user 4 is connecting with a resource instrument system 30 of another user, dual-connect signals may be utilized to require both parties to accept the communication before an electronic interaction may occur between the resource instrument systems 30. Only after acceptance by both parties, is a communication channel generated between both parties. The communication link between both systems may be created through the use of a token (e.g., a key, or the like) that is only known by both users (e.g., like a public private key pair). When the electronic interaction is completed the token gets re-generated making each communication a unique communication.

It should be understood that the resource instrument systems 30 described herein, may be particularly beneficial for the visually impaired since it has the ability to read from and write to resource instruments. As such, in some embodiments the resource systems 30 may be voice activated through the use of microphones and speakers. In addition to the reading and writing components that allow the resource instrument system 30 to read and write resource instruments, as described herein, the resource instruments systems 30 provide a number of other features that help to improve the resource management and processing of resource instruments. For example, since the resource instrument systems 30 may communicate directly with entity systems 10 and/or the user computer systems 20, notifications may be presented to the user 4 on an interface (e.g., touchscreen display, or the like) of the resources instrument systems 20 providing reminders of when particular resources distributions are required (e.g., payments that may or may not require drafting and submitting a resource instrument). As such, the resource instrument system 30 may be utilized for notifications of upcoming recurring interactions, or other interactions that may be required. For example, the resource systems 30 may be automatically linked to the user computer systems 20 (e.g., e-mail account, other notification applications) and/or resource pools with the entity systems 10 (e.g., online banking accounts), such that when an interaction occurs that requires the transfer of resources, the resource instrument system 30 may display alerts, or provide voice alerts, of the upcoming resource transfers due.

FIG. 5 presents a flow diagram for a pre-authorization and/or notification of misappropriated resource instruments, in accordance with embodiments of the present invention. Block 510 of FIG. 5 illustrates that an indication that a resource instrument has been removed from a resource instrument connector (e.g., the flap, receipt, binder, tab, or the like) is received, as previously discussed herein. For example, a check may be removed from a plurality of checks within a binder, a money order or cashier's check may be removed from copies and/or receipts of the money order, a traveler's check may be removed from a receipt portion, or the like. In removing the resource instrument, the marker 260 that is operatively coupled the resource instrument 250 and/or resource instrument connector 252 may be disturbed. For example, as previously discussed when the resource instrument 250 is torn from its resource instrument connector 252, an electrical current may be severed, which provides a signal to the smart resource instrument system 30 that indicates the resource instrument has been removed.

As illustrated by block 520, in response to the indication that the resource instrument has been removed a notification is sent to the user computer system 20 that indicates the removal of the resource instrument. In some embodiments, the notification may be a text message, e-mail message, SMS message, telephone call, application notification, or other like notification (e.g., a notification on a user's mobile device) indicating that a resource instrument has been removed from its resource connector.

Block 530 in FIG. 5 illustrates that an indication is received from the user that the resource instrument should not be activated. For example, the user 4 may indicate that the resource instrument should not be activated because the user 4 is not ready to submit the resource instrument for an interaction. In other embodiments, the user 4 may indicate that the resource instrument may be been misappropriated (e.g., stolen, or the like). In other embodiments of the invention the user 4 may not respond at all, in which case the default position may be that the resource was not misappropriated.

FIG. 5 further illustrates in block 535, that when the user 4 has indicated that the resource instrument may have been misappropriated, a notification may be sent to the entity systems 10 of the potential misappropriation, which may place a hold on the resource pool (e.g., account) to which the resource instrument is associated. For example, the user computer system 20 and/or the smart resource instrument system 30 may send a notification to the one or more the entity systems 10 that the resource instrument has not been activated, and thus any interactions involving the resource instrument should be rejected.

Block 540 illustrates that in some embodiments, an indication is received by the user computer system 20 and/or the smart resource instrument system 30 from the one or more entity systems 10 that the resource instrument will not be activated, processed, or the like, and that the event will be investigated for misappropriation. For example, if the resource instrument is submitted information regarding the submittal will be captured for further investigation of the potential misappropriation.

FIG. 5 further illustrates in block 550 that instead of receiving an indication from the user 4 that the user 4 did not activate the resource instrument, an indication may be received that the user 4 would like to activate the resource instrument. It should be understood that the activation of the resource instrument may occur after the user 4 removes the resource instrument 250 from its resource instrument connector 252, or the activation could occur before the user 4 ever removes the resource instrument 250 from its connection (e.g., before the notification is sent in block 520). In other embodiments, the ability to pre-authorize a resource instrument may exists regardless of the ability to track when particular resource instruments have been removed from the resource instrument application.

Regardless of when the resource instrument 250 is removed from its instrument connector 252, the user 4 may activate the resource instrument in a number of different ways. In one embodiment of the invention the user 4 may activate the resource instrument by entering an identifier (e.g., numbers and/or characters) into an application (e.g., an online banking application, a dedicated application, or the like). In other embodiments, the user computer system 20 and/or the resource instrument system 30 may capture resource information from the resource instrument (e.g., filled out or not filled out resource instrument). The resource information may be captured, as previously described herein, such as through an image capture, or the like. In one embodiment the resource information may include an account number that is listed on a check along with the check number, a cashier check account number and check number, a traveler's check account number and/or check number, a money order number, or the like. In other examples, the resource instrument system 30 may imprint a resource pool number (e.g., an account number, a one time or multiple use tokens, or another number) onto the resource instrument. In other embodiments of the invention, the activation of the resource instrument may occur by the user providing biometric information (e.g., fingerprint scan), facial recognition information, or the like to the instrument connector 252 of the resource instrument and/or the smart resource instrument system 30. In some embodiments the user 4 may not be able to activate the resource instrument unless the resource instrument 250 is still connected to its instrument connector 252.

Additionally, or alternatively, activation of the resource instrument 250 may require confirmation from the user 4 through a user computer system 20. For example, the marker 260 itself, and/or another activation component (e.g., chip, RFID, or other like feature similar to the marker) of the resource instrument 250 and/or communication component 32 (e.g., chip, feature, or the like) of the resource instrument system 30 may be utilized to determine that the use computer system 20 (e.g., phone, wearable device, or the like associated with the user 4) is near the resource instrument 250. For example, in some embodiments of the invention in order for the resource instrument 250 to be activated when the marker 250 is disturbed (e.g., check is torn from the binder, or the like), a feature of the resource instrument 250 and/or the resource instrument system 30 wirelessly communicates with a user computer system 30 to verify that the user 4 is located within a desired range (e.g., within feet, yards, or the like). In one embodiment the communication may occur through NFC, or other wireless communication components and processes. Regardless of the communication components, this automatic activation process may take the place of a portion of the process described in FIG. 5, or may be in addition to the process described in FIG. 5. This activation process provides additional ways to prevent misappropriation of the user 4 resource instruments.

It should be understood that along with the activation of the resource instrument, the user 4 may provide interaction requirements. For example, the interaction requirements may be a future time period, such as a future day and/or a future time (e.g., specific day and time, range of days and time, or the like) when the resource instrument should be activated. As such, the user 4 may provide the resource instrument to another user 4 (e.g., child, parent, friend, or the like), and even after the resource instrument is out of the physical control of the user 4, the user 4 may still control when the resource instrument can be used. In other embodiments of the invention the interaction requirements may further include, resource instrument amounts, third-party to which the resource instrument may be provided, or the like.

Block 555 in FIG. 5 illustrates that regardless of how the resource instrument is activated, the entity system 10 stores the identifier and/or the interaction requirements associated with the resource instrument. For example, the entity system 10 may store the identifier as being activated for a particular account and user associated with the account. Moreover, the entity system 10 may store the interaction requirements associated with the particular resource instrument.

FIG. 5 further illustrates in block 560 that an inquiry is received from a third party (e.g., merchant, other user, or the like) that a user has presented a resource instrument to enter into an interaction. The third-party may enter the resource instrument identifier into a third party system (e.g., point of sale system, or the like), in the same or similar way as a credit card may be checked by a third-party, in order to determine if the resource instrument has been activated by the first user 4.

As illustrated by block 565 in FIG. 5 a determination is made if the resource instrument associated with the inquiry is activated. That is, has the user 4 activated the resource instrument and/or does the time, location, amount, or other like interaction information meet any interaction requirements associated with the resource instrument. As such, the entity systems 30 will compare the resource instrument identifier and the interaction information of the interaction with any activated stored resource instrument identifiers and any associated interaction requirements.

Block 570 of FIG. 5 illustrates that an allowance notification is sent by the entity systems 10 to the third-party systems 40 that the resource instrument is activated when the entity systems 10 determine that the resource instrument has been activated and/or the interaction information for the interaction meets any interaction requirements.

FIG. 5 further illustrates in block 575 that a rejection notification is sent by the entity systems 10 to the third-party systems 40 that the resource entity is not activated when the entity systems 10 determine that the resource instrument has not been activated and/or the interaction information for the interaction fails to meet the interaction requirements.

It should be understood that the pre-authorization described with respect to FIG. 5 improves processing speed and security because before a third-party enters into an interaction and accepts a resource instrument from a user 4, the third-party can check if the resource instrument is active and can check with the entity systems 10 that the user's resource pool has the necessary resources before the interaction. Moreover, the first user 4 may activate only the resource instruments that the user 4 would like to use when the first user 4 would like to use them, which protects misappropriation and unauthorized use of the first user's resource instruments. That is, even if the first user's resource instruments are misappropriated, the resource instruments cannot be activated without access to the user's private resource pools at the entity systems 10, and thus, if a third-party receiving the resource instrument checks to determine if the resource instrument is active, the third-party will receive a notification that the resource instrument is not active and is likely misappropriated. Before the present invention, the first user did not have the ability to control the use of the resource instruments and the third-party did not have the ability to inquire as to the validity of the resource instrument before acceptance of the resource instrument as payment.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same systems or an external link with the other systems of other parties. The information provided by the systems may be made continuously available, however, continuously available does not necessarily mean that the sources actually continuously generate data, but that a sources are continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the term entity may related to a "financial institution" and/or "financial entity", which includes any organization that processes financial resource transfers including, but not limited to, banks, credit unions, savings and loan associations, investment companies, stock brokerages, assess management firms, insurance companies and the like. In specific embodiments of the invention, use of the term "bank" may be limited to a financial entity in which account-bearing customers conduct financial resource transfers, such as account deposits, withdrawals, transfers and the like.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/730,582 | SMART RESOURCE INSTRUMENTS AND DEVICES | Concurrently herewith |

What is claimed is:

1. A method for pre-approving use of one or more resource instruments, the method comprising:

receiving, by one or more processing components, an activation indication from a user for activation of the one or more resource instruments for one or more interactions, wherein the activation indication includes at least one or more resource instrument identifiers, and wherein the activation indication is received from a user computer system or a resource instrument system;

activating, by the one or more processing components, the one or more resource instruments for the one or more interactions using the one or more resource instrument identifiers;

receiving, by the one or more processing components, a separation indication that a resource instrument has been separated from a resource instrument connector, wherein the resource instrument and the resource instrument connector are operatively coupled through a marker, and wherein the resource instrument system receives a signal from the marker when the resource instrument has been separated from the resource instrument connector;

sending, by the one or more processing components, a separation notification to the user that the resource instrument has been separated from the resource instrument connector, wherein the separation notification is sent to the user computer system;

receiving, by the one or more processing components, an inquiry from a third-party regarding an interaction, wherein the inquiry includes interaction information, wherein the interaction information includes at least a resource instrument identifier from the resource instrument, and wherein the inquiry is received from a third-party system;

determining, by the one or more processing components, when the resource instrument identifier received from the third-party meets the one or more resource instrument identifiers activated by the user and send an allowance notification to the third-party, wherein the allowance notification is sent to the third-party system; and determining, by the one or more processing components, when the resource instrument identifier received from the third-party fails to meet the one or more resource instrument identifiers activated by the user and send a rejection notification to the third-party, wherein the rejection notification is sent to the third-party system.

2. The method of claim 1, wherein the activation indication from the user further includes one or more interaction requirements for the one or more resources instruments, and wherein the method further comprises:
comparing, by the one or more processing components, the interaction information received from the third-party with the one or more interaction requirements received from the user;
wherein the allowance notification is sent when the interaction information meets the one or more interaction requirements; and
wherein the rejection notification is sent when the interaction information fails to meet the one or more interaction requirements.

3. The method of claim 1, wherein the one or more resource instrument identifiers comprise a resource pool number and a resource instrument number.

4. The method of claim 1, wherein the marker is a conductor that when torn loses an electrical current that results in the signal, is a sticker that when removed loses the electrical current that results in the signal, is a radio frequency identification tag that when removed results in the signal, or a chip that when torn results in the signal.

5. The method of claim 1, further comprising:
receiving, by the one or more processing components, a rejection indication from the user to reject the activation of the resource instrument.

6. The method of claim 1, wherein receiving the activation indication from the user to activate the one or more resource instruments for the one or more interactions comprises receiving the activation indication from the user to activate the resource instrument after the resource instrument has been separated from the resource instrument connector.

7. A computer program product for pre-approving the use of one or more resource instruments, the computer program product comprising at least one non-transitory computer-readable medium having computer-readable program code portions embodied therein, the computer-readable program code portions comprising:
an executable portion configured to receive an activation indication from a user for activation of the one or more resource instruments for one or more interactions, wherein the activation indication includes at least one or more resource instrument identifiers, and wherein the activation indication is received from a user computer system or a resource instrument system;
an executable portion configured to activate the one or more resource instruments for the one or more interactions using the one or more resource instrument identifiers;
an executable portion configured to receive a separation indication that a resource instrument has been separated from a resource instrument connector, wherein the resource instrument and the resource instrument connector are operatively coupled through a marker, and wherein the resource instrument system receives a signal from the marker when the resource instrument has been separated from the resource instrument connector;
an executable portion configured to send a separation notification to the user that the resource instrument has been separated from the resource instrument connector, wherein the separation notification is sent to the user computer system;
an executable portion configured to receive an inquiry from a third-party regarding an interaction, wherein the inquiry includes interaction information, wherein the interaction information includes at least a resource instrument identifier from the resource instrument, and wherein the inquiry is received from a third-party system;
an executable portion configured to determine when the resource instrument identifier received from the third-party meets the one or more resource instrument identifiers activated by the user and send an allowance notification to the third-party, wherein the allowance notification is sent to the third-party system; and
an executable portion configured to determine when the resource instrument identifier received from the third-party fails to meet the in the one or more resource instrument identifiers activated by the user and send a rejection notification to the third-party, wherein the rejection notification is sent to the third-party system.

8. The computer program product of claim 7, wherein the activation indication from the user further includes one or more interaction requirements for the one or more resources instruments, and wherein the computer-readable program code portions further comprise:
an executable portion configured to compare the interaction information received from the third-party with the one or more interaction requirements received from the user;
wherein the allowance notification is sent when the interaction information meets the one or more interaction requirements; and
wherein the rejection notification is sent when the interaction information fails to meet the one or more interaction requirements.

9. The computer program product of claim 7, wherein the one or more resource instrument identifiers comprise a resource pool number and a resource instrument number.

10. The computer program product of claim 7, wherein the marker is a conductor that when torn loses an electrical current that results in the signal, is a sticker that when removed loses the electrical current that results in the signal, is a radio frequency identification tag that when removed results in the signal, or a chip that when torn results in the signal.

11. The computer program product of claim 7, wherein the computer-readable program code portions further comprise:
an executable portion configured to receive a rejection indication from the user to reject the activation of the resource instrument.

12. The computer program product of claim 7, wherein receiving the activation indication from the user to activate the one or more resource instruments for the one or more interactions comprises receiving the activation indication from the user to activate the resource instrument after the resource instrument has been separated from the resource instrument connector.

13. A system for pre-approving use of one or more resource instruments, the system comprising:
one or more memory components storing computer-readable program code; and
one or more processing components operatively coupled to the one or more memory components, wherein the one or more processing components are configured to execute the computer-readable program code to:
receive an activation indication from a user for activation of the one or more resource instruments for one or more interactions, wherein the activation indication includes at least one or more resource instrument identifiers, and wherein the activation indication is received from a user computer system or a resource instrument system;

activate the one or more resource instruments for the one or more interactions using the one or more resource instrument identifiers;

receive a separation indication that a resource instrument has been separated from a resource instrument connector, wherein the resource instrument and the resource instrument connector are operatively coupled through a marker, and wherein the resource instrument system receives a signal from the marker when the resource instrument has been separated from the resource instrument connector;

send a separation notification to the user that the resource instrument has been separated from the resource instrument connector, wherein the separation notification is sent to the user computer system;

receive an inquiry from a third-party regarding an interaction, wherein the inquiry includes interaction information, wherein the interaction information includes at least a resource instrument identifier from the resource instrument, and wherein the inquiry is received from a third-party system;

determine when the resource instrument identifier received from the third-party meets the one or more resource instrument identifiers activated by the user and send an allowance notification to the third-party, wherein the allowance notification is sent to the third-party system; and determine when the resource instrument identifier received from the third-party fails to meet the one or more resource instrument identifiers activated by the user and send a rejection notification to the third-party, wherein the rejection notification is sent to the third-party system.

14. The system of claim 13, wherein the activation indication from the user further includes one or more interaction requirements for the one or more resources instruments, and wherein the one or more processing components are further configured to execute the computer-readable program code to:

compare the interaction information received from the third-party with the one or more interaction requirements received from the user;

wherein the allowance notification is sent when the interaction information meets the one or more interaction requirements; and wherein the rejection notification is sent when the interaction information fails to meet the one or more interaction requirements.

15. The system of claim 13, wherein the one or more resource instrument identifiers comprise a resource pool number and a resource instrument number.

16. The system of claim 13, wherein the marker is a conductor that when torn loses an electrical current that results in the signal, is a sticker that when removed loses the electrical current that results in the signal, is a radio frequency identification tag that when removed results in the signal, or a chip that when torn results in the signal.

17. The system of claim 13, wherein the one or more processing components are further configured to execute the computer-readable program code to:

receive a rejection indication from the user to reject the activation of the resource instrument.

18. The system of claim 13, wherein receiving the activation indication from the user to activate the one or more resource instruments for the one or more interactions comprises receiving the activation indication from the user to activate the resource instrument after the resource instrument has been separated from the resource instrument connector.

* * * * *